July 7, 1953 K. W. TAPKE 2,644,851
THERMOCOUPLE
Filed May 4, 1950
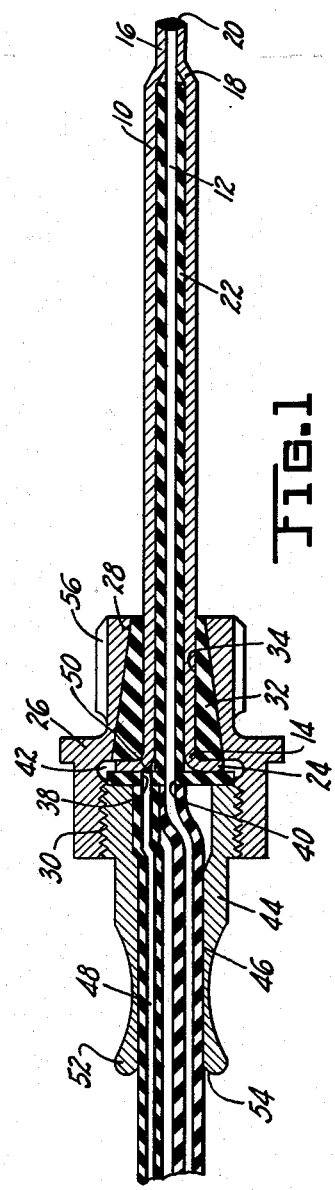
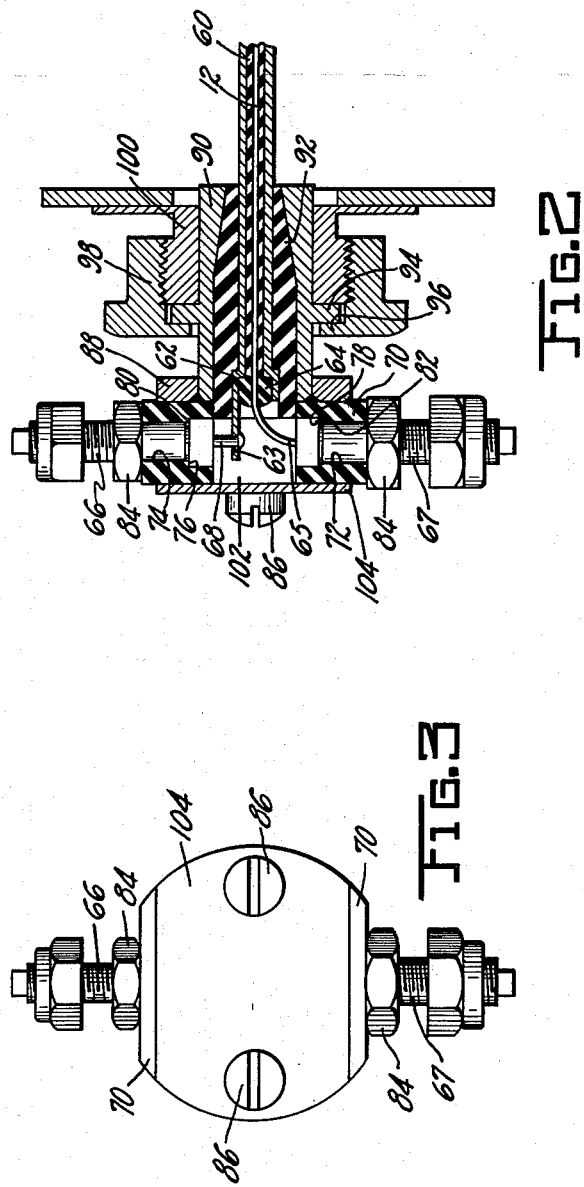
INVENTOR.
KENNETH W. TAPKE
BY Cecil J. Arens
ATTORNEY Patented July 7, 1953

2,644,851

UNITED STATES PATENT OFFICE 2,644,851

THERMOCOUPLE

Kenneth W. Tapke, South Bend, Ind., assignor to Bendix Aviation Corporation, South Bend, Ind., a corporation of Delaware Application May 4, 1950, Serial No. 160,053

1 Claim. (Cl. 136—4)

This invention relates to a thermo-electric differential thermometer and more particularly to an improvement of such a device to render the same usable in a wide range of temperatures.

An important object of the invention is to provide a thermocouple in which one of the conductors is completely encased by the other.

A further object of the invention resides in the provision of a thermocouple the conductors of which are supported by means which also serves as a mounting for terminals to which said conductors are attached to furnish an integrated unit.

The above objects and features of the invention will be apparent from the following description of the apparatus taken in connection with the accompanying drawings in which:

Figure 1 is a view in section of one form of the device of the invention;

Figure 2 is a view in section of another form of the invention; and

Figure 3 is a top plan view of the device of Figure 2.

Referring now to the drawing the reference numeral 10 designates a probe, which forms one of the conductors of the thermocouple, and through which a second conductor or wire 12 passes. The probe is provided with a large opening 14 at one end and a smaller opening 16 at the other end. The smaller opening has a diameter substantially that of the inner conductor. The inner conductor has one end extending through the large opening 14 to the exterior of the probe and the other end passing through the small opening 16. The inner conductor is secured in contact relationship to a reduced end 18 of the probe by a fuse weld to provide a thermojunction 20. An electrical insulating sleeve 22, concentric with the probe 10, provides a lining for the probe, which surrounds the inner conductor from one end of the probe to the other.

The probe 10 or outer conductor is made from Chromel and the inner conductor is made from Alumel. The thermo-electric properties of these two metals, when in contact relationship is well known.

The end of the probe opposite the thermojunction is formed with a flange 24. An adapter 26 is provided with an interiorly tapered section 28 and a threaded portion 30. An exteriorly tapered insulating bushing 32 is formed with an axially extending opening 34 through which the reduced end of the probe is passed for engagement with the flange 24. The adapter is positioned on the probe so as to embrace the bushing, with the tapered portion of the latter fitted into the interiorly tapered section of the former. An insulating washer 36, having openings 38 and 40 therein, is placed over the large opening 14, and is of a diameter greater than the diameter of the flange 24, to thereby keep the flange out of contact with the adapter. The washer 36 and flange 24 are housed in a recess 42 of the adapter.

A retaining nut 44 has one end threaded for engagement with the threaded portion 30 of the adapter. The nut is drilled axially at 46 to receive a two wire cable, the wires of which pass through openings 38 and 40 of the insulating washer. One of the wires 48 which is made of the same material as the outer conductor is connected to the outer conductor at 50 and the other wire is the inner conductor 12. The end of the nut 44 which threads into the adapter bears against the washer 36 when in assembled relationship, as shown in the drawing. The end of the nut opposite from its threaded end is equipped with a flared portion 52 having a rounded interior 54, thus providing a substantial radius, around which the wires can bend.

Any suitable mounting may be employed for retaining the thermocouple in position. In the instant case the adapter 26 is formed with a threaded exterior portion 56 which engages a mating threaded opening, not shown.

The device of the application represents an improvement over the art in utilizing one of the electrical conductors or wires as a gas protective element, thus prolonging the life of the thermocouple. Forming one of the conductors, the one which is more resistant to heat, into a sleeve, and encasing the other conductor within the sleeve, also represents a saving in materials and cost of manufacture. With this novel arrangement, the sleeve performs a two-fold purpose.

In the modification of Figure 2, the thermocouple of Figure 1 is provided with an improved terminal block assembly to which conductors 12 and 60 are attached. Corresponding parts which are identical in the two figures will have the same numerical designation. The conductor 60 is in the form of a probe with an enlarged open end 62 equipped with an extended side portion 63. The conductor 12 is fully encased in the probe 60, in the same manner as in Figure 1, and is insulated therefrom by the insulator 22 concentrically located inside the probe. A fish spine ceramic bead 64 encircles the inner wire 12 and is carried in the enlarged open end 62 to prevent contact therewith at the bend 65. A pair of diametrically related terminals 66 and 67 are radially disposed adjacent the open end of the probe. The terminal 66 is connected to the extension 63, of the outer conductor, or probe 60, by wire 68. The wire 68, which is of the same material as the terminal 66 and the probe, is fuse welded to said terminal and probe respectively at its ends. The end of the wire 12 away from the thermojunction is suitably connected to the terminal 67 by fuse welding.

These terminals 66 and 67 are carried between insulating blocks 70, formed with diametral grooves 72 and 74, into which the terminals are fitted. Shoulders 76 and 78 of the terminals 66 and 67 respectively engage the shoulders 80 and 82 of the insulating blocks to securely hold the terminals in place when locknuts 84 are turned down tightly. Screws 86 pass through the insulating blocks 70 and threadedly engage a plate 88, securely fixed to an adapter 90, concentrically positioned adjacent the open end of the probe and insulated therefrom by an insulator 92.

To support the thermocouple device the adapter 90 is equipped with an integral flange 94 for engagement with a flange 96, of a nut 98, which is threadedly secured to supporting structure 100.

Cavity 102, at the open end of the probe, is filled with an insulating cement, and covered by plate 104 through which the screws 86 pass.

The structural arrangement of the modified device facilitates mounting and simplifies connecting the same into an electrical network, not shown.

Although this invention has been described in connection with certain specific embodiments the principles are susceptible of numerous other applications that will readily occur to persons skilled in the art.

Having thus described the various features of the invention, what I claim as new and desire to secure by Letters Patent is:

A thermocouple device comprising a metal sleeve forming a conductor for said device, a nonmetallic lining throughout a substantial length of the sleeve, a wire forming another conductor for said device and passing through said sleeve and separated therefrom by the lining, said wire being made of metal unlike that of the sleeve and secured in contact relationship to said sleeve at one end to provide a thermojunction, means carried by the metal sleeve but insulated therefrom for fastening the device to a supporting structure, said metal sleeve providing a support for said wire and lining and having a greater part of its length extending beyond said supporting structure, said last named means also providing a terminal support, and terminals carried by said last named support to be connected to the ends of the conductors opposite the thermojunction.

KENNETH W. TAPKE.

References Cited in the file of this patent

UNITED STATES PATENTS

| Number | Name | Date |
|---|---|---|
| 935,154 | Hopkins | Sept. 28, 1909 |
| 1,584,882 | Marsh et al. | May 18, 1926 |
| 1,675,210 | Campbell et al. | June 26, 1928 |
| 2,466,175 | Kretsch et al. | Apr. 5, 1949 |

OTHER REFERENCES

Foster, Journal of Scientific Instruments (1932), vol. 9, page 296.